United States Patent [19]

Kanai et al.

[11] Patent Number: 4,786,869

[45] Date of Patent: Nov. 22, 1988

[54] TONER LEVEL SENSOR

[75] Inventors: Kenichi Kanai; Osamu Shimoe, both of Kumagaya, Japan

[73] Assignee: Hitachi Metals Ltd., Tokyo, Japan

[21] Appl. No.: 927,137

[22] Filed: Nov. 5, 1986

Related U.S. Application Data

[63] Continuation-in-part of Ser. No. 589,116, Mar. 2, 1984, abandoned.

[30] Foreign Application Priority Data

Jul. 12, 1982 [JP] Japan ............ 57-120781
Jul. 12, 1983 [WO] PCT Int'l Appl. ............ JP83/00222

[51] Int. Cl.[4] ............ G01B 7/06

[52] U.S. Cl. ............ 324/207; 118/712; 222/DIG. 1; 355/133

[58] Field of Search ............ 324/202, 204, 214, 226, 324/227, 225, 233-234, 239-243; 222/52, DIG. 1; 355/3 DD, 133, 14 R, 14 D, 3 R; 118/663, 665, 688, 708, 712

[56] References Cited

U.S. PATENT DOCUMENTS

| | | | |
|---|---|---|---|
| 3,075,145 | 1/1963 | Goldberg et al. | 324/233 |
| 3,209,292 | 9/1965 | Montross | 324/243 X |
| 3,890,564 | 6/1975 | Watanabe et al. | 324/233 X |
| 4,032,227 | 6/1977 | Hubbard et al. | 355/14 D X |
| 4,186,341 | 1/1980 | Noguchi et al. | 324/236 |
| 4,195,260 | 3/1980 | Sakamoto et al. | 324/204 |
| 4,210,864 | 7/1980 | Miyakawa et al. | 324/204 |
| 4,257,348 | 3/1981 | Prohaska | 324/236 X |
| 4,265,197 | 5/1981 | Toyono et al. | 355/3 DD X |
| 4,266,868 | 5/1981 | Bresina et al. | 355/3 DD |
| 4,270,487 | 6/1981 | Terashima et al. | 324/236 X |
| 4,452,174 | 6/1984 | Fedder | 324/236 X |
| 4,519,696 | 5/1985 | Bruyndonckx et al. | 324/204 X |

*Primary Examiner*—Reinhard J. Eisenzopf
*Assistant Examiner*—Warren S. Edmonds
*Attorney, Agent, or Firm*—Antonelli, Terry & Wands

[57] ABSTRACT

A toner level sensor for detecting the presence or absence or the level of residual amount of the toner of an electronic copier or the like. In order to secure stable operation regardless of changes of external environmental conditions such as temperature and humidity, a pair of transformers are provided with primary coils and secondary coils respectively wound on magnetic cores having a magnetic gap. When a magnetic member is present in the vicinity of a magnetic gap, the phases of the outputs of the secondary coils are opposite to each other, so that the differential output of the secondary coils is phase detected to determine the presence or absence of the residual toner amount or the level of residual amount.

4 Claims, 5 Drawing Sheets

TONER LEVEL SENSOR

CROSS-REFERENCE TO RELATED APPLICATIONS

This application is a continuation-in-part of U.S. application Ser. No. 589,116, filed on Mar. 2, 1984, now abandoned.

BACKGROUND OF THE INVENTION

The present invention relates to a toner level sensor for detecting the presence or absence or the level of residual amount of a toner for an electronic copier or the like, or more in particular to a toner level sensor which operates stably regardless of changes of external environmental conditions such as temperature or humidity.

In conventional toner level sensors, as shown in FIG. 1, a transformer 8 including a primary coil 2 and a secondary coil 3 wound on a magnetic core 1 having a magnetic gap 20 is used, so that the output of the secondary coil 3 is positively fed back through an amplifier 4 thereby to form an oscillation loop. When a toner 5 having magnetism is located in the vicinity of the magnetic gap of the magnetic core 1, the coupling coefficient of the magnetic circuit changes with the level of residual amount of the toner, with the result that the feedback rate $\beta$ changes, and therefore the oscillation level changes as shown in FIG. 2. Thus, by adjusting and setting appropriately the coupling coefficient of the transformer 8 by a fine adjustment system (not shown), it is possible to identify and detect the level B with the residual amount of toner or the level A without any residual amount of toner.

In the above-mentioned conventional toner level sensor shown in FIG. 1, however, the oscillation level should ideally change stepwise with $\mu\beta=1$ as a boundary where $\beta$ is the amount of feedback and $\mu$ the amplification factor of an amplifier of the oscillation circuit. Actually, however, as shown by a solid line 6 in FIG. 2, the oscillation level rises gently and approaches a maximum value through an intermediate rise state. The intermediate state of this oscillation level is very sensitive to the external conditions such as temperature or humidity, and therefore a drift D is often caused as shown by a dashed line 6_a_ and a dashed line 6_b_ in FIG. 2. As a result, in the case where the detection of the toner level is set as A and B in FIG. 2 as mentioned above, such a disadvantage occurs that it may be utterly impossible to detect the toner level due to the change of feedback amount caused by the drift.

This effect of drift may be avoided by adding a temperature compensating circuit, for instance, in which case the problem is an increased number of component parts. Another problem point is that since the causes of the change of the oscillation level at the intermediate state are complicated, full compensation therefor is very difficult in view of the product variations.

SUMMARY OF THE INVENTION

The object of the present invention is to obviate the above-mentioned problem points of the prior art and to provide a toner level sensor of novel construction which is capable of stable operation even under changing external environmental conditions such as temperature and humidity.

In order to achieve the above-mentioned objects, the present invention is characterized by two transformers each including a primary coil and a secondary coil wound on a magnetic core having a magnetic gap, wherein when a magnetic material is present in the vicinity of the respective magnetic gaps, the phase of the output of the respective secondary coils are opposite to each other, so that the residual amount of toner is detected by phase detecting the differential output of the secondary coils.

In the present invention, a greater effect is obtained if a magnetic material is arranged in the vicinity of the magnetic gap of the magnetic core of one transformer, so that a minus (or plus) phase detection output is produced in the absence of toner, while a phase detection output of opposite polarity is produced in the presence of toner of more than a predetermined amount.

Also, in the present invention, forming the magnetic cores making up the above-mentioned two transformers as a common magnetic core or common magnetic cores which may be partly shared by the two transformers is effective for stabilization of operation.

These and further objects, features and advantages of the present invention will become more obvious from the following description when taken in connection with the accompanying drawings wherein:

DESCRIPTION OF THE PREFERRED EMBODIMENT

The present invention will be described in detail below with reference to the drawings.

Figure 1:
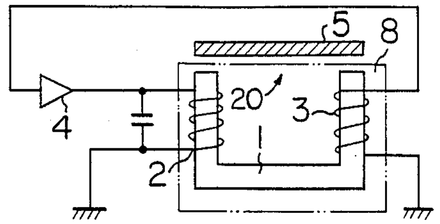
FIG. 1 PRIOR ART
FIG. 1 is a diagram schematically showing a construction of a conventional toner level sensor.
Figure 2:
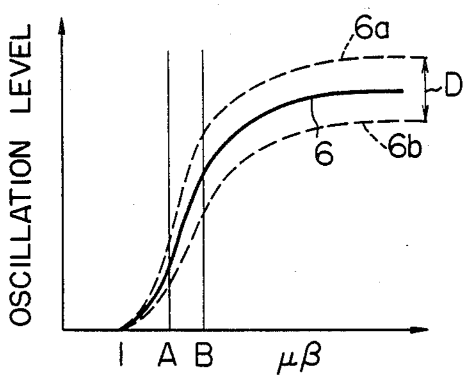
FIG. 2 PRIOR ART
FIG. 2 is a diagram for explaining the operation of the conventional toner level sensor shown in FIG. 1.
Figure 3:
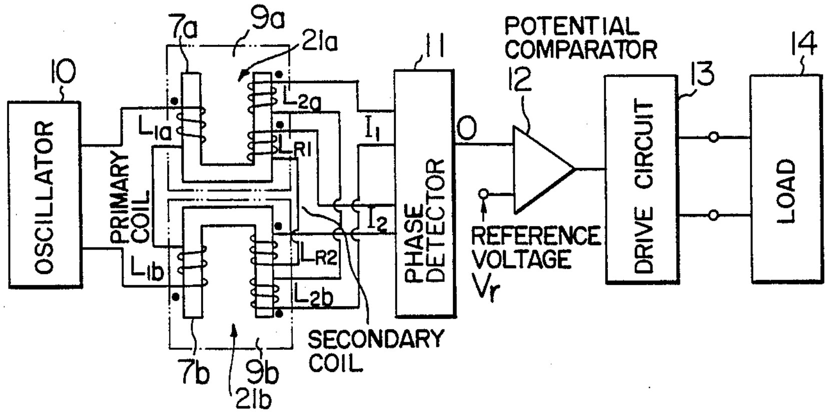
FIG. 3 is a diagram schematically showing an embodiment of the toner level sensor according to the present invention.
Figure 4:
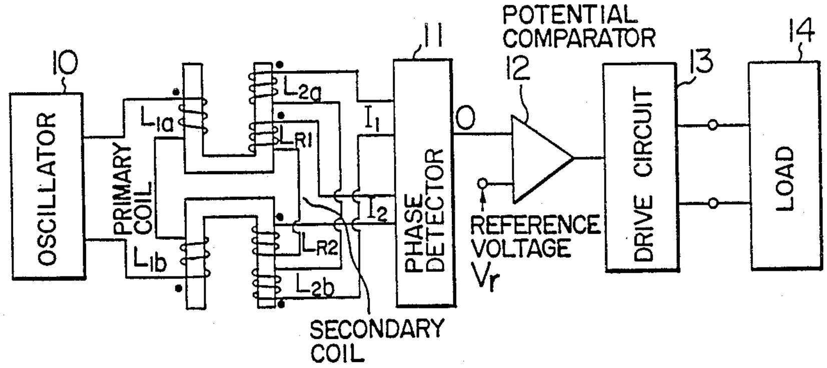
FIG. 4 is a diagram schematically showing another embodiment of the present invention.
Figure 5:
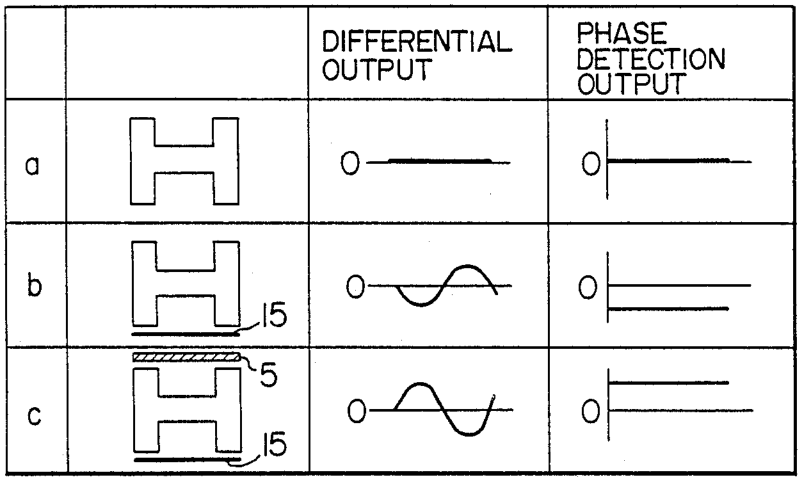
FIG. 5 is a diagram for explaining the operation of a toner level sensor according to the present invention shown in FIG. 4.

FIG. 3 is a diagram schematically showing the construction of an embodiment of a toner level sensor according to the present invention. FIG. 4 is a diagram schematically showing another embodiment of the present invention. FIG. 5 is a diagram for explaining the operation of a toner level sensor according to the present invention shown in FIG. 4. FIG. 1 which is indicated to be the prior art shows the utilization of a C-shaped core. When a toner having a magnetism is located in the vicinity of the magnetic gap of the magnetic core 1, the coupling coefficient of the magnetic circuit changes with the level of residual amount of the toner.

In the present invention, as illustrated in FIG. 3, two symmetrical C-shaped cores are provided each having a magnetic gap represented by reference numerals 21_a_ and 21_b_. C-shaped magnetic cores 7_a_, 7_b_ making up two transformers 9_a_, 9_b_ and having magnetic gaps 21_a_, 21_b_ are used respectively, and are wound respectively with primary coils $L_{1a}$, $L_{1b}$ and secondary coils $L_{2a}$, $L_{2b}$. Also, coils $L_{R1}$, $L_{R2}$ are wound on the secondary side as reference signal detection coils. If the separate C-shaped cores of FIG. 3 are joined together a H-shaped core is provided having a common magnetic path portion as shown in FIG. 4.

In FIGS. 3 and 4, the primary coils $L_{1a}$, $L_{1b}$ are connected to the output terminal of an oscillator 10, and the secondary coils $L_{2a}$, $L_{2b}$ and the reference signal detection coils $L_{R1}$, $L_{R2}$ are connected to the signal input terminal $I_1$ and the reference signal input terminal $I_2$ of a phase detector 11 respectively. The output O of the phase detector 11 is connected to be applied to a potential comparator 12. Further, an output signal from the phase detector 11 is compared with a reference voltage Vr corresponding to a preset toner level at a potential comparator 12, the output of which is adapted to drive a load 14 (such as a control circuit or display circuit) through a drive circuit 13.

In the above-described toner level sensor according to the present invention, upon application of an oscillation output from the oscillator 10 to the primary coils $L_{1a}$, $L_{1b}$, output signals corresponding to the degrees of coupling of the respective magnetic circuits made up of the two transformers 9*a*, 9*b* (FIG. 3) or a corresponding two transformer (FIG. 4) are induced in the secondary coils $L_{2a}$, $L_{2b}$. In the case where the degrees of coupling of the two magnetic circuits are equal to each other, the outputs of the secondary coils $L_{2a}$, $L_{2b}$ are of opposite phases and cancel each other, so that the operation outputs thereof are reduced to 0 as shown in row a of FIG. 5. In the case where the toner remains, on the other hand, the degrees of coupling of the magnetic circuits are different from each other, and therefore the output of the magnetic circuit to which the toner is proximate is larger than the other. As a result the output difference is detected by the phase detector 11 to produce a phase detection output corresponding to the phase involved. In this case, as shown in row b of FIG. 5, in order for a predetermined differential output to be produced, a magnetic member 15 may be arranged with respect to the magnetic gap of the magnetic circuits, so that the phase detection output is normally minus (or plus), while when the toner of more than a predetermined amount remains, a reverse output is produced by a toner 5 having magnetism as shown in row c of FIG. 5. This method may be more useful for level detection.

As illustrated in row c of FIG. 5, a magnetic member 15 is arranged with respect to the magnetic gap of one of the magnetic circuits so that a minus (or plus) phase detection output is produced in the absence of toner, while a phase detection output of opposite polarity is produced in the presence of toner of more than a predetermined amount. In this manner, the coupling coefficient of the magnetic circuit having such magnetic member 15 arranged at the gap thereof is set to a value equivalent to the coupling coefficient exhibited when the toner level lies within a predetermined range and since the other magnetic circuit is arranged to have the coupling coefficient vary in proportion to the toner level, as shown in row b and c of FIG. 5, the phase detection output will be of one polarity when no magnetic toner 5 is present (row b) and will be of the opposite polarity when magnetic toner 5 of a sufficient level is present (row c).

Referring again to FIG. 3, the oscillator 10 applies an AC current, for example, to each primary coil $L_{1a}$ and $L_{1b}$ of the magnetic cores 7*a* and 7*b* of the magnetic circuits or transformers 9*a* and 9*b*. An AC output appears at each secondary coil ($L_{2a}$, $L_{2b}$) of the pair of transformers by this AC current. Further, since the secondary coils ($L_{2a}$, $L_{2b}$) are connected and have polarity as shown by the dot proximate thereto, the AC outputs at the secondary side are arranged to cancel each other with the difference or differential output being inputted to the phase detector 11 as represented by the input $I_1$ which is a difference signal. Since the magnetic cores having the magnetic gaps 21*a* and 21*b* are symmetrical in shape and size, when no magnetic material exists at either gap, the coupling coefficients of such magnetic cores and circuits are substantially the same. Additionally, the mutual inductance between each of the primary coils ($L_{1a}$, $L_{1b}$) and each of the secondary coils ($L_{2a}$, $L_{2b}$) is substantially the same value so that due to the connection of the secondary coils, the differential output is substantially zero. However, when magnetic toner level increases at the gap 21*a* of the magnetic core 7*a* of the transformer 9*a*, the mutual inductance of the magnetic core 7*a* becomes larger than that of the magnetic core 7*b* and such value is represented in the differential output $I_1$.

In order to discriminate whether magnetic toner more than a predetermined level exists at the gap of the magnetic core 7*a* or not, a magnetic member 15 is positioned at the magnetic gap of the magnetic core 7*b* of the transformer 9*b* so as to increase the coupling coefficient of the magnetic core 7*b* to a value corresponding to a predetermined level of the magnetic toner. Thus, when the coupling coefficient of the magnetic core 7*a* caused by magnetic toner existing at the gap of the magnetic core 7*a* is less than the increased part of the coupling coefficient of the magnetic core 7*b*, caused by the magnetic member 15, the output of the transformer 9*b* and the secondary coil is greater than that of the transformer 9*a* and conversely, when the magnetic toner level at the gap 21*a* increases to a level so as to have the coupling coefficient of the magnetic cores 7*a* be greater than the coupling coefficient of the magnetic core 7*b*, the output of the transformer 9*a* and the secondary coil thereof is larger than that of the transformer 9*b*. That is, when a level of magnetic toner more than the predetermined level is provided, a sine curve is outputted as the output $I_1$ whereas, on the other hand, when the magnetic toner level is less than the predetermined level, a reversed sine curve shifted by $\pi$ is outputted as the output $I_1$. Of course, the amplitude of the sine curve depends upon the extent of increase or decreases with respect to the predetermined level. The output $I_1$ is supplied to a phase detector 11.

Figure 6:
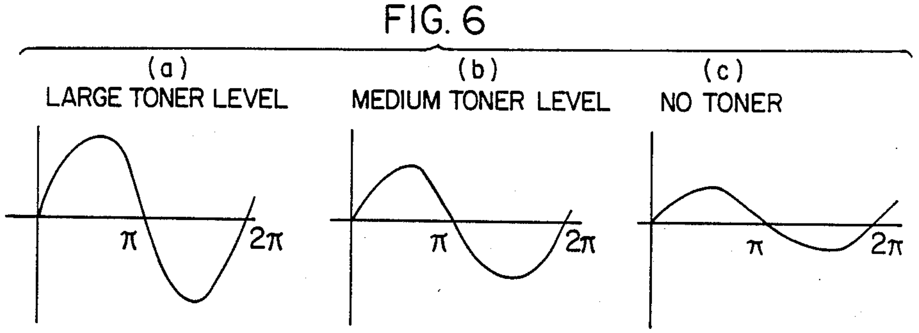
FIG. 6 to 14 are diagrams for explaining the operation of a phase detector according to the present invention.
Figure 7:
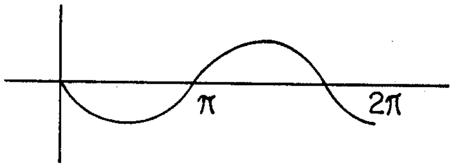
Figure 8:
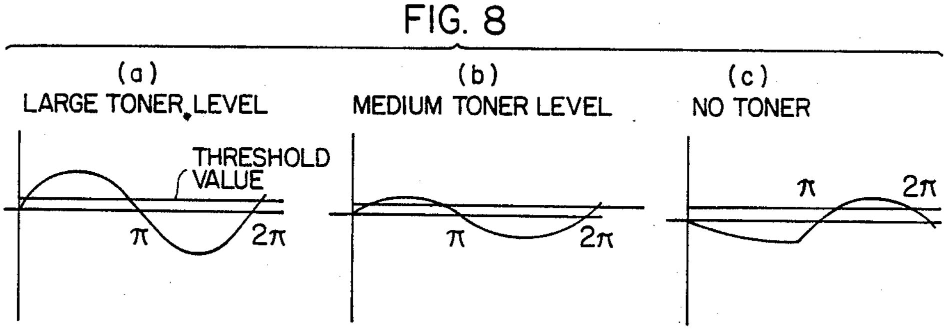
Figure 9:
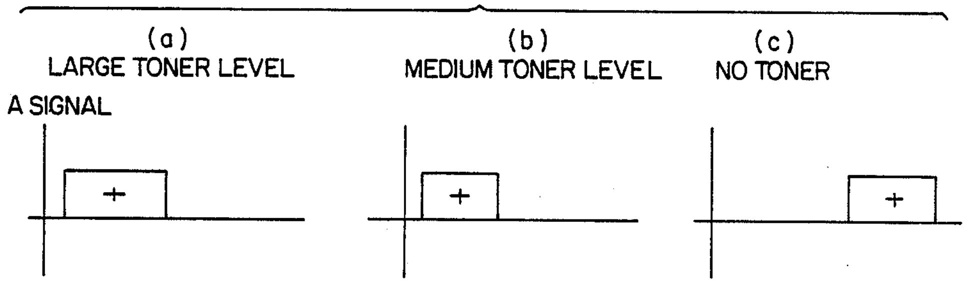
Figure 10:
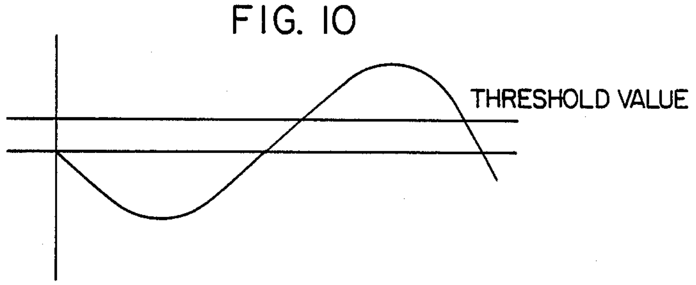
Figure 11:
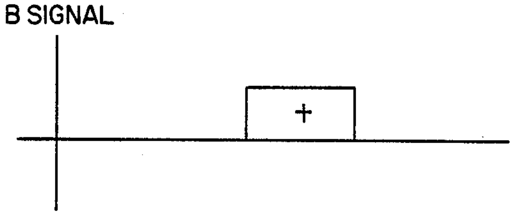

In order to effect a phase detection, such detection must be achieved with respect to a reference. Reference signal detection coils ($L_{R1}$, $L_{R2}$) are provided, as illustrated in FIG. 3, and are wound on the secondary side of each magnetic core with the coils being connected and having the same polarity as shown by the dot proximate thereto and the output $I_2$, which is a sum signal is obtained therefrom and supplied to the phase detector. While, as pointed out above, the phase of the differential output $I_1$ changes by the level of the magnetic toner, the phase of the reference output $I_2$ does not change in dependence thereon. Accordingly, the phase detector detects the phase between such outputs and provides a output indicative thereof to the potential comparator 12 wherein it is compared with a reference voltage $V_r$ and utilized to drive a drive circuit in accordance with the difference therebetween. The operation of the phase detector will be explained referring FIG. 6–FIG. 14. Referring to FIG. 6, the output of the secondary coil ($L_{2a}$) of the transformer 9*a* varies in accordance with the level of the magnetic toner, i.e., large toner level, medium toner level and no toner. On the other hand, the output of the secondary coil ($L_{2a}$) of the transformer 9*b* is constant since the magnetic member 15 is arranged at the gap thereof as shown in FIG. 7. Consequently, the total output of the secondary coils is shown in FIG. 8. When the total output is compared with a threshold value (that is only a positive value) the total output $I_1$ is as shown as the A signal in FIG. 9. On the other hand, the signal at the reference signal detection coil ($L_{R1}$, $L_{R2}$) due to the connection of such coils is shifted by 180 degrees or is the reverse of the sine curve in FIG. 8(*a*) with this signal being shown in FIG. 10. When this signal is compared with a positive threshold value the result is shown in FIG. 11.

The phase detector operates to compare the phases of the signals input thereto and such may be accomplished by an Exclusive OR operation as well be explained in the following.

Figure 12:
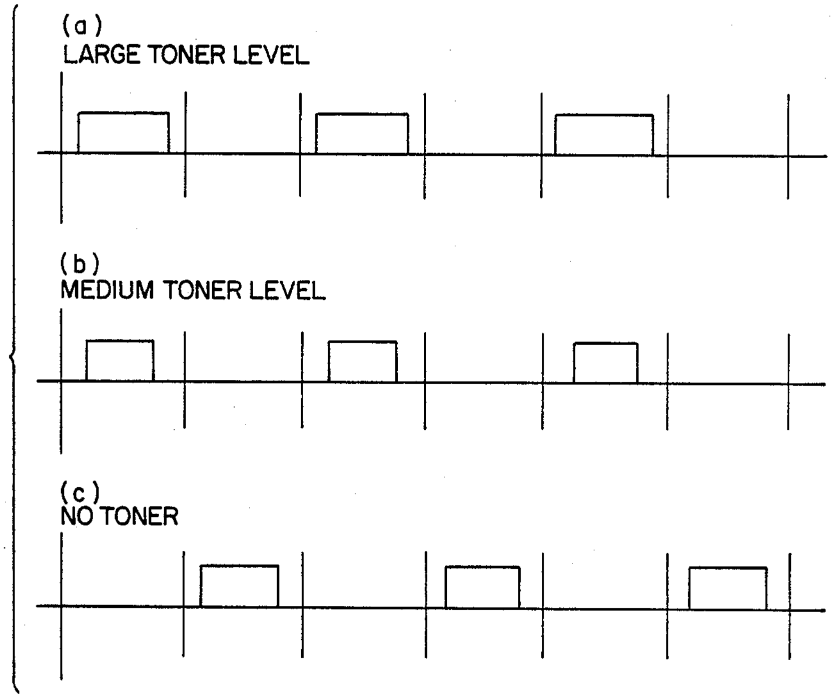
Figure 13:
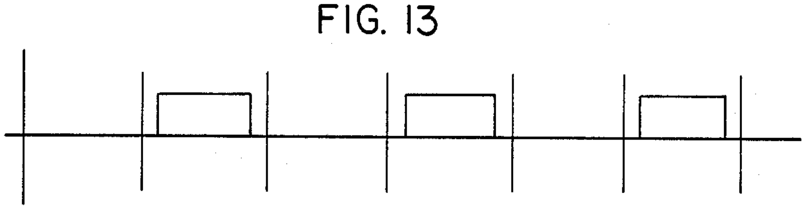
Figure 14:
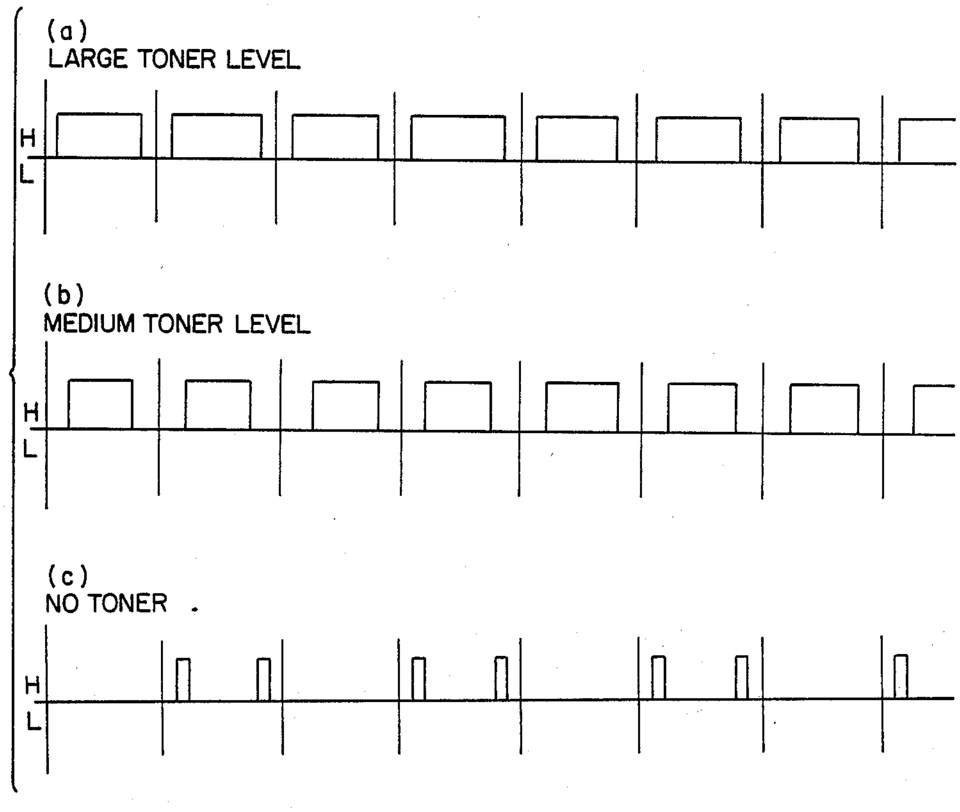

The signal (A signal) as determined by the threshold of the differential output $I_1$ is shown in FIG. 12 for the different levels of toner. The signal (B signal) of the reference output $I_2$ is shown in reference FIG. 13. Based upon an Exclusive OR operation of such signals, the signal values FIG. 14 are obtained as shown in by the phase detector 11. The thus obtained signal can be rectified, for example, by a low pass filter provided in the last stage of the phase detector, and changed to a DC current level as represented by the phase detection outputs of FIG. 5 row b and row c. Thereafter, the amplitude of the output of the phase detector is compared with the reference voltage $V_r$ by means of the potential comparator 12 and the output thereof is supplied to a drive circuit 13 so as to control the toner supply, for example.

As described in detail above, according to the present invention, the residual amount of toner is detected by comparing the output signals of a couple of magnetic circuits, and therefore a highly accurate detection is possible without being substantially affected by changes of such external environmental conditions as temperature and humidity, thus producing a very high industrial advantage.

While we have shown and described various embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A toner level sensor for detecting magnetic toner level in a developing unit, comprising:

at least first and second magnetic circuits each having magnetic gaps, the coupling coefficient of one of said first and second magnetic circuits being set at a predetermined value equivalent to the coupling coefficient exhibited when the toner level lies within a predetermined range, the coupling coefficient of the other of said first and second magnetic circuits varying in proportion to the toner level;

coil members wound about each of said first and second magnetic circuits for providing a differential output from said first and second magnetic circuits;

means coupled to said first and second magnetic circuits for providing a reference A.C. signal; and phase detector means for comparing the phases of the differential output and the reference A.C. signal, and for providing an output indicative of the phase comparison as an indication of toner level.

2. A toner level sensor according to claim 1, further comprising comparator means for comparing the output of said phase detector means with a reference value.

3. A toner level sensor according to claim 1, wherein said first and second magnetic circuits include two symmetrically disposed magnetic cores of like shape and size.

4. A toner level sensor according to claim 1, wherein said first and second magnetic circuits have a common magnetic path portion.

* * * * *